(12) United States Patent
Singh (10) Patent No.: US 8,699,982 B2
(45) Date of Patent: Apr. 15, 2014

(54) SYSTEMS AND METHODS FOR IMPLEMENTING A DISTRIBUTED ANTENNA SYSTEM IN A RADIO FREQUENCY INTEGRATED CIRCUIT

(75) Inventor: Baljit Singh, San Jose, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 248 days.

(21) Appl. No.: 13/430,863

(22) Filed: Mar. 27, 2012

(65) Prior Publication Data

US 2013/0260706 A1    Oct. 3, 2013

(51) Int. Cl.
*H04B 7/00*    (2006.01)

(52) U.S. Cl.
USPC .................... 455/257; 455/226.1; 455/562.1; 370/280

(58) Field of Classification Search
CPC ........... H04B 1/26; H04B 1/005; H04W 4/18; H04W 88/085
USPC .................................... 455/257, 226.1, 562.1
See application file for complete search history.

(56) References Cited

U.S. PATENT DOCUMENTS

| | | | | |
|---|---|---|---|---|
| 5,029,183 A * | 7/1991 | Tymes | ........................... | 375/141 |
| 5,103,461 A * | 4/1992 | Tymes | ........................... | 375/141 |
| 5,142,550 A * | 8/1992 | Tymes | ........................... | 375/141 |
| 5,157,687 A * | 10/1992 | Tymes | ........................... | 375/140 |
| 5,175,867 A * | 12/1992 | Wejke et al. | .................. | 455/439 |
| 5,280,498 A * | 1/1994 | Tymes et al. | ................... | 370/328 |
| 5,301,056 A * | 4/1994 | O'Neill | ......................... | 398/115 |
| 5,375,007 A * | 12/1994 | O'Neill | ......................... | 398/115 |
| 5,463,656 A * | 10/1995 | Polivka et al. | ................. | 375/130 |
| 5,475,677 A * | 12/1995 | Arnold et al. | .................. | 370/280 |
| 5,479,441 A * | 12/1995 | Tymes et al. | ................... | 375/130 |
| 5,528,621 A * | 6/1996 | Heiman et al. | ................. | 375/133 |
| 5,539,730 A * | 7/1996 | Dent | ............................. | 370/280 |
| 5,566,168 A * | 10/1996 | Dent | ............................. | 370/323 |
| 5,668,803 A * | 9/1997 | Tymes et al. | ................... | 370/312 |
| 5,754,536 A * | 5/1998 | Schmidt | ........................ | 370/330 |
| 5,890,056 A * | 3/1999 | Garner et al. | .............. | 455/67.11 |
| 5,914,946 A * | 6/1999 | Avidor et al. | ................. | 370/336 |
| 5,963,845 A * | 10/1999 | Floury et al. | ................. | 455/12.1 |
| 6,088,570 A * | 7/2000 | Komara et al. | .............. | 455/11.1 |
| 6,091,303 A * | 7/2000 | Dent | ................................ | 331/2 |

(Continued)

OTHER PUBLICATIONS

"Superhet Multi-band Upconverter", Aug. 2004, pp. 1-21, Publisher: RF Magic, Inc.

(Continued)

*Primary Examiner* — Hai V Nguyen
(74) *Attorney, Agent, or Firm* — Fogg & Powers LLC (57) ABSTRACT

A remote antenna unit includes an uplink integrated circuit (IC) and a downlink IC. The uplink IC includes an uplink synthesizer that provides an uplink oscillating signal; an uplink mixer stage that mixes an uplink radio frequency signal with the uplink oscillating signal to produce an uplink intermediate frequency signal; and an uplink control interface that receives uplink commands that control the frequency of the uplink oscillating signal. The downlink IC includes a downlink synthesizer that provides a downlink oscillating signal; a downlink mixer stage that mixes the downlink intermediate frequency signal with a downlink oscillating signal to produce a down link radio frequency signal; a downlink control interface that receives downlink commands that control the frequency of the downlink oscillating signal. The antenna unit also includes a clock that provides a reference frequency to the uplink and downlink synthesizers.

40 Claims, 5 Drawing Sheets

(56) References Cited

U.S. PATENT DOCUMENTS

| | | | |
|---|---|---|---|
| 6,128,510 A * | 10/2000 | Beukema et al. | 455/557 |
| 6,144,652 A * | 11/2000 | Avidor et al. | 370/336 |
| 6,157,621 A * | 12/2000 | Brown et al. | 370/310 |
| 6,463,266 B1 * | 10/2002 | Shohara | 455/196.1 |
| 6,539,253 B2 * | 3/2003 | Thompson et al. | 607/2 |
| 6,625,435 B1 * | 9/2003 | Ramesh | 455/313 |
| 6,690,662 B1 * | 2/2004 | Komara et al. | 370/342 |
| 6,748,212 B2 * | 6/2004 | Schmutz et al. | 455/424 |
| 6,801,767 B1 * | 10/2004 | Schwartz et al. | 455/426.2 |
| 6,889,033 B2 * | 5/2005 | Bongfeldt | 455/11.1 |
| 6,914,539 B2 * | 7/2005 | Hoctor et al. | 340/870.12 |
| 6,957,042 B2 * | 10/2005 | Williams | 455/7 |
| 6,961,325 B1 * | 11/2005 | Avidor et al. | 370/336 |
| 6,985,705 B2 * | 1/2006 | Shohara | 455/164.1 |
| 7,020,219 B2 * | 3/2006 | Panasik et al. | 375/324 |
| 7,139,567 B2 * | 11/2006 | Bokulic et al. | 455/427 |
| 7,154,398 B2 * | 12/2006 | Chen et al. | 340/573.1 |
| 7,398,062 B2 * | 7/2008 | Mocquard et al. | 455/92 |
| 7,483,504 B2 * | 1/2009 | Shapira et al. | 375/347 |
| 7,792,510 B2 * | 9/2010 | Pestryakov et al. | 455/260 |
| 7,817,958 B2 * | 10/2010 | Scheinert et al. | 455/3.01 |
| 7,822,148 B2 * | 10/2010 | Shapira et al. | 375/299 |
| 7,869,828 B2 * | 1/2011 | Wang et al. | 455/561 |
| 7,920,858 B2 * | 4/2011 | Sabat et al. | 455/422.1 |
| 7,965,670 B2 * | 6/2011 | Wang | 370/319 |
| 8,010,116 B2 * | 8/2011 | Scheinert | 455/443 |
| 8,098,612 B2 * | 1/2012 | Chang | 370/316 |
| 8,160,570 B2 * | 4/2012 | Sabat et al. | 455/422.1 |
| 8,200,180 B2 * | 6/2012 | Hanneman | 455/254 |
| 8,208,414 B2 * | 6/2012 | Singh et al. | 370/280 |
| 8,229,497 B2 * | 7/2012 | Scheinert | 455/550.1 |
| 8,396,368 B2 * | 3/2013 | Tarlazzi et al. | 398/115 |
| 8,428,510 B2 * | 4/2013 | Stratford et al. | 455/7 |
| 8,548,330 B2 * | 10/2013 | Berlin et al. | 398/115 |
| 8,568,140 B2 * | 10/2013 | Kovac et al. | 433/29 |
| 2001/0031646 A1 * | 10/2001 | Williams | 455/560 |
| 2002/0026224 A1 | 2/2002 | Thompson et al. | 607/60 |
| 2002/0045431 A1 * | 4/2002 | Bongfeldt | 455/234.1 |
| 2002/0045461 A1 * | 4/2002 | Bongfeldt | 455/522 |
| 2002/0173282 A1 * | 11/2002 | Panasik et al. | 455/130 |
| 2003/0087617 A1 * | 5/2003 | Shohara | 455/192.2 |
| 2004/0015199 A1 * | 1/2004 | Thompson et al. | 607/36 |
| 2004/0066312 A1 * | 4/2004 | Hoctor et al. | 340/870.07 |
| 2004/0097189 A1 * | 5/2004 | Bongfeldt et al. | 455/7 |
| 2005/0003791 A1 * | 1/2005 | Bokulic et al. | 455/334 |
| 2008/0219292 A1 * | 9/2008 | Wang | 370/484 |
| 2008/0261534 A1 * | 10/2008 | Wang et al. | 455/67.11 |
| 2009/0154621 A1 * | 6/2009 | Shapira et al. | 375/347 |
| 2011/0237182 A1 * | 9/2011 | Stratford et al. | 455/7 |
| 2012/0257659 A1 * | 10/2012 | Braz et al. | 375/222 |
| 2013/0195467 A1 * | 8/2013 | Schmid et al. | 398/115 |
| 2013/0237260 A1 * | 9/2013 | Lin et al. | 455/501 |

OTHER PUBLICATIONS

"High Performance Wideband RF Synthesizer/VCO With Integrated RF Mixer", 2006, pp. 1-18, Publisher: RF Micro Devices, Inc.

"Superhet Multi-Band Downconverting Tuner Covers Input Bands from 1.8GHz to 3.8GHz", Aug. 26, 2004, pp. 1-24, Publisher: RF Magic, Inc.

* cited by examiner

SYSTEMS AND METHODS FOR IMPLEMENTING A DISTRIBUTED ANTENNA SYSTEM IN A RADIO FREQUENCY INTEGRATED CIRCUIT

BACKGROUND

Distributed antenna systems (DAS) transmit signals from a base station to wireless terminals through remote antenna units (RAUs). Wireless terminals can include multiple devices that communicate through multiple frequency bands. To transmit signals to the wireless terminals, the RAUs transmit and receive signals in the multiple frequency bands. To be capable of transmitting and receiving in the multiple frequency bands, the RAUs frequently include multiple components that allow the required up and down conversion from intermediate frequencies to radio frequencies and vice versa. However, the multiple components consume substantial space on a circuit board. The space consumed by the multiple components increases the size of the RAUs.

SUMMARY

A remote antenna unit in a distributed antenna system is provided. The antenna unit includes an uplink integrated circuit, wherein the uplink integrated circuit receives a radio frequency signal. The uplink integrated circuit includes an uplink synthesizer configured to provide an uplink oscillating signal in at least one frequency; an uplink mixer stage coupled to the uplink synthesizer, the uplink mixer stage configured to mix the uplink radio frequency signal with the uplink oscillating signal to produce an uplink intermediate frequency signal; and an uplink control interface configured to receive uplink commands that control the frequency of the uplink oscillating signal. The antenna unit further includes a downlink integrated circuit that is electrically isolated from the uplink integrated circuit, wherein the downlink integrated circuit receives a downlink intermediate frequency signal. The downlink integrated circuit includes a downlink synthesizer configured to provide a downlink oscillating signal in at least one frequency; a downlink mixer stage coupled to the downlink synthesizer, the downlink mixer stage configured to mix the downlink intermediate frequency signal with the downlink oscillating signal to produce a down link radio frequency signal; a downlink control interface configured to receive downlink commands that control the frequency of the downlink oscillating signal. The antenna unit also includes at least one clock configured to provide at least one reference frequency to the uplink synthesizer and the downlink synthesizer.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific exemplary embodiments. However, it is to be understood that other embodiments may be utilized and that logical, mechanical and electrical changes may be made. The following detailed description is, therefore, not to be taken in a limiting sense.

Embodiments described in the present application limit the space consumed by multiple electronic components of an RAU by consolidating elements onto integrated circuits (ICs). For example, the multiple electronic components of an RAU are placed onto two separate ICs. Electronic components associated with the downlink functionality of the RAU are placed on a downlink IC while electronic components associated with the uplink functionality of the RAU are placed on an uplink IC. In particular, the uplink IC and the downlink IC include components for generating oscillating signals in multiple frequency bands and for mixing a received intermediate frequency signal up to a radio frequency, in the case of the downlink IC, or mixing a received radio frequency signal down to an intermediate frequency, in the case of the uplink IC. The consolidation of components onto the two ICs saves space while allowing for the reception and transmission of signals in multiple frequency bands.

Figure 1:
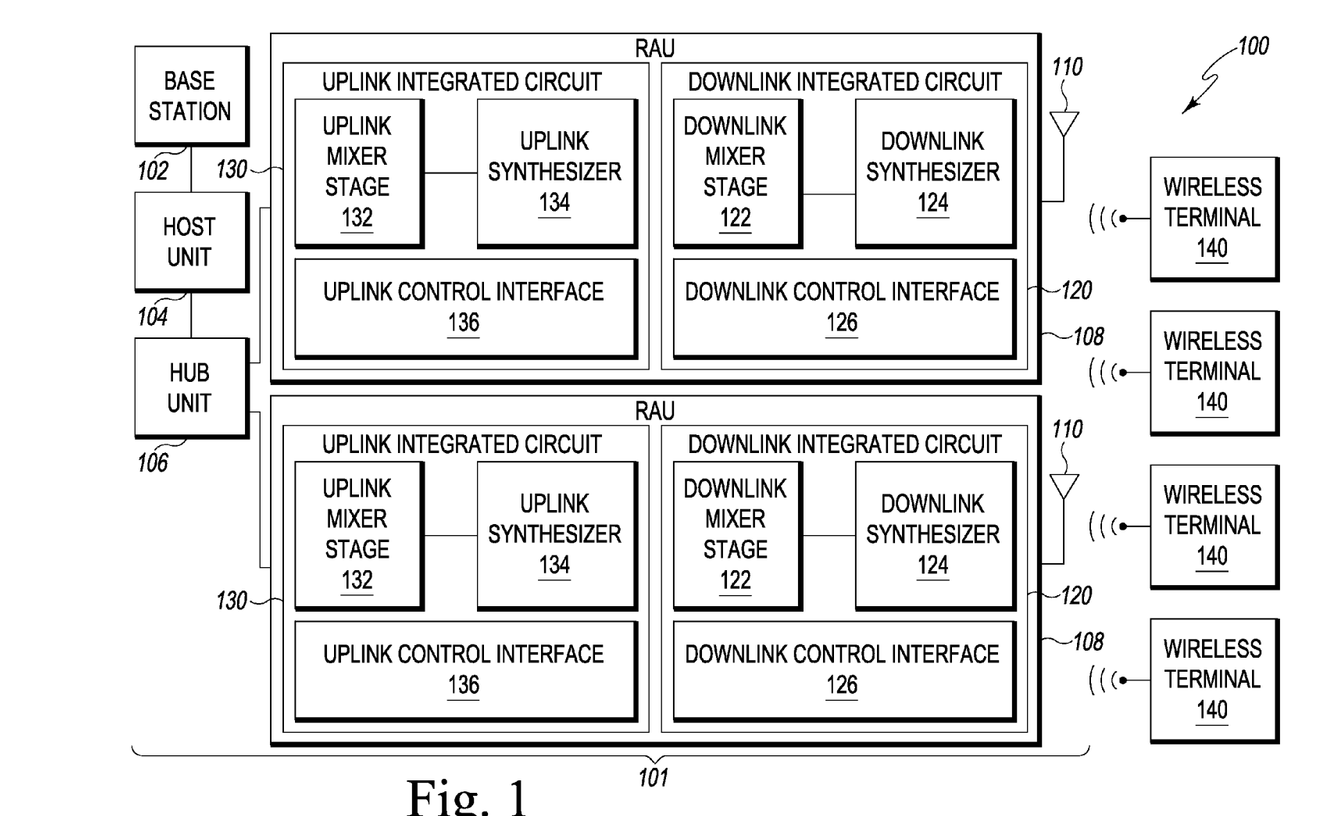
FIG. 1 is a block diagram of one embodiment of a distributed antenna system, where the remote antenna units include radio frequency integrated circuits.

FIG. 1 illustrates an exemplary embodiment of a communication network 100. In the embodiment shown in FIG. 1, communication network 100 includes a base station 102, which is communicatively coupled to a distributed antenna system (DAS) 101. In certain embodiments, DAS 101 transports communication signals between one or more upstream devices (for example, base station 102, wireless access points, or other sources of communication signals) and one or more downstream wireless devices (for example, a wireless terminal 140 such as a cellular phone).

Base station 102 manages communication among wireless terminals 140 and between wireless terminals 140 and other communication networks that are coupled to base station 102. In one embodiment, base station 102 manages communication between wireless terminals 140 and a public switched telephone network (PSTN). In this embodiment, for example, communication network 100 is a cellular/PCS system and base station 102 communicates with a base station controller which acts as a voice/PSTN gateway to the PSTN. In another embodiment, base station 102 manages communication between wireless terminals 140 and an internet protocol (IP)-based network (such as the internet via communication with an IP gateway). In at least this implementation, base station 102 performs baseband processing on IP data from an IP gateway and places the IP data onto a channel. In one embodiment, base station 102 is an IEEE 802.16 compliant base station. Optionally, base station 102 may also meet the requirements of WiMax, WiBro, LTE, or other consortium. In yet other embodiments, base station 102 comprises multiple functionalities including managing communications between both a PSTN and an IP-based network.

DAS 101 comprises a host unit 104 communicatively coupled to base station 102. Host unit 104 provides an interface through which DAS 101 can be controlled and configured by a user. Further, host unit 104 is communicatively coupled with a hub unit 106. In certain implementations, the host unit 104 is coupled to multiple hub units 106. In certain embodiments, hub unit 106 receives a digital signal from host unit 104 and converts the digital signal into an analog signal for transmission to a RAU 108. Alternatively, host unit 104 converts a digital signal into an analog signal for transmission to hub unit 106, which hub unit 106 then repeats and splits the signal for transmission to multiple RAUs 108.

RAUs 108 receive signals from hub unit 106 and transmit the signals to wireless terminals 140 through remote antennas 110. In the uplink direction, a wireless terminal 140 transmits information that is received by the RAU 108 that is communicating with the transmitting wireless terminal 140 through a remote antenna 110 attached to the RAU 108. RAU 108 reproduces the signal received from wireless terminal 140 and sends the signal along with other signals received from other wireless terminals 140 transmitting to RAU 108 to hub unit 106. Hub unit 106 receives information from RAU 108, reproduces the signals received and sends the signals to base station 102 through host unit 104. Base station 102 processes the information and transmits the information toward its destination. In the downlink direction, incoming information from another network is received by base station 102. Base station 102 determines which of wireless terminals 140 is the destination of the information, generates, modulates, and transmits a signal containing the information to hub unit 106 through host unit 104. Hub unit 106 receives the signal, reproduces the signal, and sends the signal to the RAU 108 that is in communication with the destination wireless terminal 140. RAU 108 receives the signal from hub unit 106, reproduces the signal, and sends the signal wirelessly to wireless terminal 140, where the information is received and processed.

In certain embodiments, RAU 108 upconverts signals received from hub unit 106 from an intermediate frequency (IF) signal to a radio frequency (RF) signal for transmission to a wireless terminal 140. Further, RAU 108 downconverts signals received from wireless terminals 140 from an RF signal to an IF signal for transmission to hub unit 106. To perform the upconversion and downconversion of both received IF and RF signals, RAU includes both downlink circuitry to perform the conversion from IF to RF and uplink circuitry to convert an RF signal into an IF signal. In at least one embodiment, a portion of the uplink circuitry and a portion of the downlink circuitry are implemented as integrated circuits. For example, the portion of the uplink circuitry is implemented as uplink IC 130 and the portion of the downlink circuitry is implemented as downlink IC 120. Further, the uplink circuitry and downlink circuitry are implemented as two separate integrated circuits in order to isolate electrical signals that pass through the uplink IC 130 from electrical signals that pass through the downlink IC 120.

In at least one embodiment, uplink IC 130 includes an uplink mixer stage 132 and an uplink synthesizer 134. Uplink mixer stage 132 receives an RF signal from wireless terminal 140. Upon receiving the RF signal, uplink mixer stage 132 downconverts the RF signal to an IF signal. The IF signal is then transmitted to the hub unit 106. In certain embodiments, when downconverting the RF signal to an IF signal, uplink mixer stage 132 receives an oscillating signal from uplink synthesizer 134. Uplink synthesizer 134 is a section of hardware in uplink IC 130 that produces an oscillating signal that uplink mixer stage 132 uses as a the mixing signal to downconvert the RF signal into the IF signal.

In a further embodiment, downlink IC 120 includes a downlink mixer stage 122 and a downlink synthesizer 124. Downlink mixer stage 122 receives an IF signal from hub unit 106. Upon receiving the IF signal, downlink mixer stage 122 upconverts the IF signal to an RF signal. The RF signal is then transmitted to a wireless terminal 140 through a remote antenna 110. In certain embodiments, when upconverting the IF signal to an RF signal, downlink mixer stage 122 receives an oscillating signal from downlink synthesizer 124. Downlink synthesizer 124 is a section of hardware in downlink IC 120 that produces an oscillating signal that downlink mixer stage 122 uses as a the mixing signal to upconvert the IF signal into the RF signal. In at least one implementation, the downlink mixer stage 122 and the downlink synthesizer 124 are electrically isolated from one another on downlink IC 120. The downlink mixer stage 122 and downlink synthesizer 124 are electrically isolated from one another to prevent electrical signals that pass through downlink mixer stage 122 and downlink synthesizer 124 from inadvertently affecting one another.

In certain embodiments, uplink IC 130 is able to receive and downlink IC 120 is able to transmit RF signals in a variety of frequency bands. For example, uplink IC 130 is able to receive and downlink IC 120 is able to transmit RF signals in frequency bands that include Cell, IDEN800, EGSM, IDEN900, PCS, DCS, UMTS, 700UC, 700ABC, AWS, or the like. In at least one implementation, uplink IC 130 is able to receive RF signals that are within the frequency range 690 MHz to 2000 MHz. Further, uplink IC 130 is able to transmit IF signals that are within the frequency range of 40 MHz to 650 MHz. Also, downlink IC 120 is able to receive IF signals that are within the frequency range of 40 MHz to 650 MHz and transmit RF signals that are within the frequency range of 700 MHz to 2200 MHz.

To transmit and receive RF signals and IF signals over the wide band of frequencies, both uplink synthesizer 134 and downlink synthesizer 124 provide oscillating signals in a wide range of frequencies to uplink mixer stage 132 and downlink mixer stage 122. For example, to convert RF signals to IF signals, uplink synthesizer 134 provides an oscillating signal to uplink mixer stage 132 in the frequency range of 750 MHz to 2600 MHz. Further, to convert IF signals to RF signals, downlink synthesizer 124 provides an oscillating signal to downlink mixer stage 122 in the frequency range of 590 MHz to 2600 MHz. In certain implementations, both uplink mixer stage 132 and downlink mixer stage 122 provide high side and low side mixing. To control the oscillating signals produced by both uplink synthesizer 134 and downlink synthesizer 124, both uplink IC 130 and downlink IC 120 receive uplink commands and downlink commands through uplink control interface 136 and downlink control interface 126 respectively. In one embodiment, the uplink and downlink commands are sent to uplink IC 130 and downlink IC 120 from an external computer or controlling device. Alternatively, in at least one embodiment, RAUs 108 include a microcontroller that sends uplink and downlink commands to uplink control interface 136 and downlink control interface 126. By consolidating uplink mixer stage 132 and uplink synthesizer 134 on to a single uplink IC 130, while allowing an external device to control the operation of uplink IC 130 through uplink control interface 136, and consolidating similar components on to a single downlink IC 120, the components of RAUs 108 occupy less space within the RAUs 108 and enable the controlling of both receiving and transmitting RF and IF signals from RAUs 108.

Figure 2:
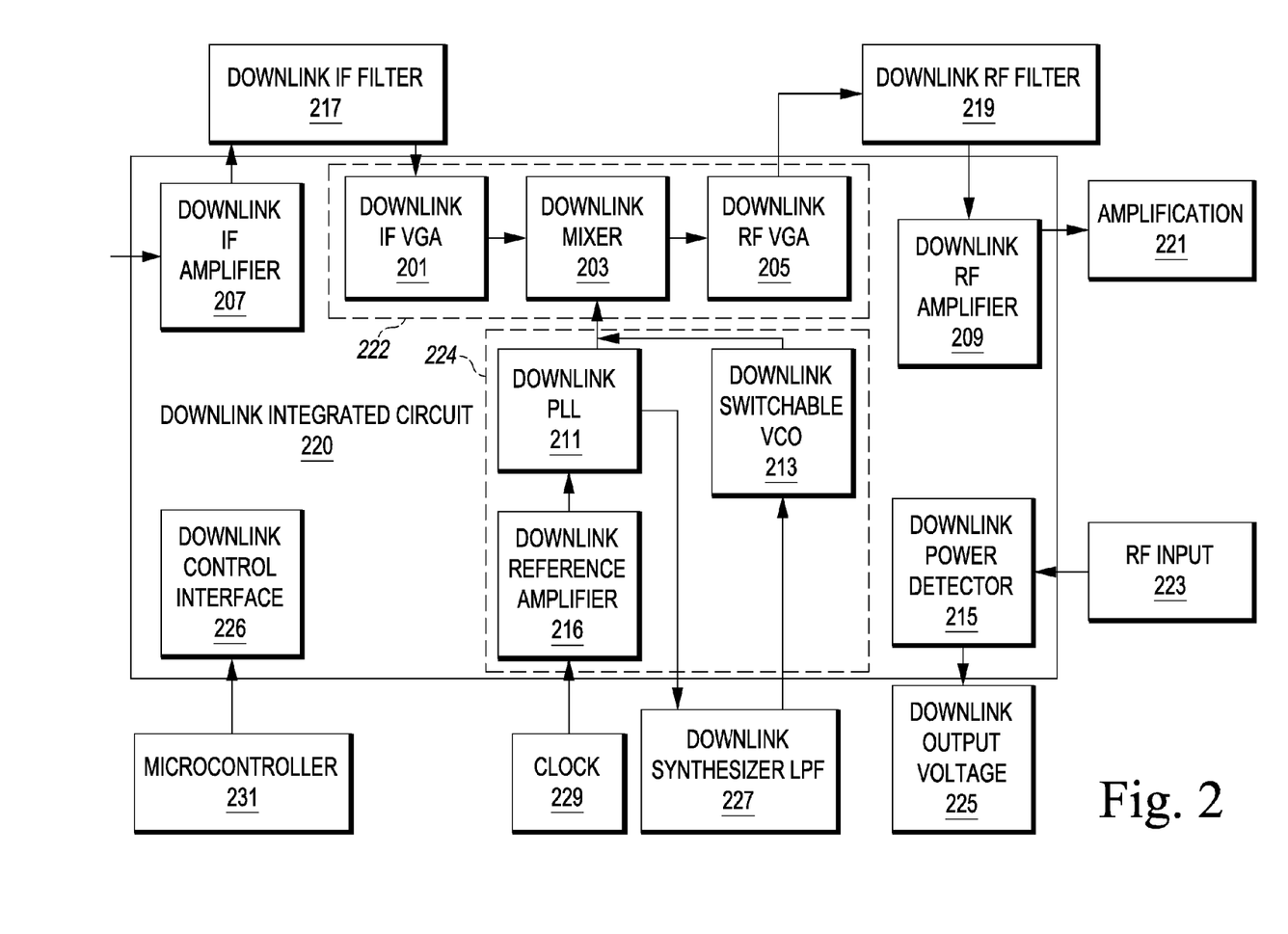
FIG. 2 is a block diagram of one embodiment of a downlink integrated circuit in an RAU.

FIG. 2 is a block diagram illustrating one embodiment of the downlink IC 220 along with supporting electronic components. Downlink IC 220 functions similarly to downlink IC 120 in FIG. 1. In at least one embodiment, downlink IC 220 includes downlink mixer stage 222, downlink synthesizer 224, and downlink control interface 226, which are similar to downlink mixer stage 122, downlink synthesizer 124, and downlink control interface 126. Before downlink mixer stage 222 receives the IF signal, the IF signal is received by a downlink IF amplifier 207, which amplifies the IF signal. When the IF signal is amplified by downlink IF amplifier 207, the downlink IC 220 transmits the signal to a downlink IF filter 217 which attenuates, filters, and adjusts the slope of the IF signal. In one embodiment downlink IF filter 217 includes a series of attenuation pads, a surface acoustic wave filter, and an adjustable slope circuit. When the IF signal has been filtered and adjusted, the downlink IF filter 217 transmits the IF signal back to downlink IC 220, where the signal is received by downlink mixer stage 222.

In certain embodiments, downlink mixer stage 222 includes a downlink IF variable gain attenuator (VGA) 201. In one example, downlink IF VGA 201 is able to provide a gain of up to 30 dB and can be adjusted in 1 dB steps. Further, an off chip component or external computer can adjust the gain of downlink IF VGA 201 through downlink commands transmitted through downlink control interface 226. When downlink IF VGA 201 attenuates the gain of the IF signal, downlink IF VGA 201 transmits the attenuated IF signal to downlink mixer 203. Downlink mixer 203 receives a downlink oscillating signal from downlink synthesizer 224 and uses the oscillating signal to mix the amplified IF signal up to RF to form the RF signal. When downlink mixer 203 upconverts the IF signal to the RF signal, the RF signal is then transmitted to a downlink RF VGA 205. Downlink RF VGA 205 functions similarly to downlink IF VGA 201, in that the attenuation provided by downlink RF VGA 205 is controlled by an off chip component or by an external computer through downlink control interface 226. For example, downlink RF VGA 205 responds to a digital signal that adjusts the gain of downlink RF VGA 205 between 0 and 10 dB when amplifying the RF signal.

When, the downlink RF VGA 205 amplifies the RF signal, the RF signal is transmitted off downlink IC 220 to a downlink RF filter 219. In at least one implementation, downlink RF filter 219 includes attenuation pads and a surface acoustic wave filter to filter the mixed signal for transmission to a wireless terminal. When the RF signal has been filtered, the downlink RF filter 219 transmits the signal back to the downlink IC 220. Downlink IC 220 receives the filtered RF signal and directs the filtered RF signal to a downlink RF amplifier 209. Downlink RF amplifier 209 amplifies the RF signal and the signal is then transmitted off the board for further amplification 221 before the RF signal is transmitted through a remote antenna such as remote antenna 110 in FIG. 1.

As described above in FIG. 1, the downlink mixer stage 222 receives an oscillating signal that is produced by downlink synthesizer 224. Downlink synthesizer 224 produces the oscillating signal from a clock 229 or other device for producing a reference frequency. In certain implementations, when producing a reference frequency, clock 229 is able to provide multiple reference frequencies. For example, clock 229 provides reference frequencies of 10.7 MHz or 30.72 MHz. The Downlink synthesizer 224 receives the reference frequency with downlink reference amplifier 216. Downlink reference amplifier 216 amplifies the reference frequency for use in creating an oscillating signal. In at least one implementation, reference amplifier 216 also squares the reference frequency signal to create a low jitter squarewave. When downlink reference amplifier 21 amplifies the reference frequency, the downlink reference amplifier 216 passes the amplified reference frequency to downlink phase locked loop (PLL) 211. Downlink PLL 211 adjusts the phase of the amplified reference frequency as necessary and transmits the adjusted reference frequency off the downlink IC to a downlink synthesizer low pass filter (LPF) 227. The downlink synthesizer LPF 227 filters the adjusted reference frequency and passes the filtered reference frequency to downlink switchable voltage controlled oscillator (VCO) 213. Downlink switchable VCO 213 receives downlink commands through downlink control interface 226 that direct VCO 213 to provide the oscillating signal with the needed frequency for accurately mixing the IF signal to the desired RF signal. The downlink switchable VCO 213 provides an oscillating signal that is combined with a corrective signal transmitted from downlink PLL 211 to provide the oscillating signal that is used by downlink mixer 203. In at least one implementation, a downlink command received through downlink control interface 226 can disable downlink synthesizer 224. When downlink synthesizer 224 is disabled, downlink mixer 203 receives an oscillating signal from a local oscillator that is located off of downlink integrated circuit 220. In at least one implementation, when downlink PLL 211 loses frequency lock, the frequency provided by the downlink switchable VCO 213 changes such that the downlink PLL 211 is able to lock the frequency.

In a further embodiment, downlink integrated circuit 220 includes a downlink power detector 215. Downlink power detector 215 monitors the power from an RF input 223. For example, downlink power detector 215 is a root mean square (RMS) detector that detects the power reflected from an antenna port on the RAU within a range up to 35 dB. In at least one implementation, when the reflected power exceeds a pre-set threshold, a downlink command will disable portions of the downlink IC 220 to prevent the reflected power from damaging the portions of the downlink IC. For example, when the reflected power exceeds the threshold, a downlink command can disable the downlink RF amplifier 209. The downlink power detector 215 transmits the measured power as an output voltage 225. In at least one embodiment, the output voltage is received by a microcontroller.

As was described in relation to FIG. 1, where downlink IC 120 included a downlink control interface 126, downlink IC 220 includes a downlink control interface 226. In certain embodiments, downlink control interface 226 is a SPI wire interface that allows an external device to control the different components that are on downlink IC 220. For example, an external device can send downlink commands through downlink control interface that set the frequency of the oscillating signal. Further, the downlink commands can disable components on downlink IC 220. For example, a downlink command can disable downlink RF amplifier 209 when downlink power detector 215 detects an RF input 223 that is higher than a test threshold. In one embodiment, the external device connected to downlink IC 220 through downlink control interface 226 is a microcontroller 231 that is part of the RAU. In an alternative embodiment, the external device is a computer that connects to the RAU and to downlink control interface 226 on the RAU.

Figure 3A:
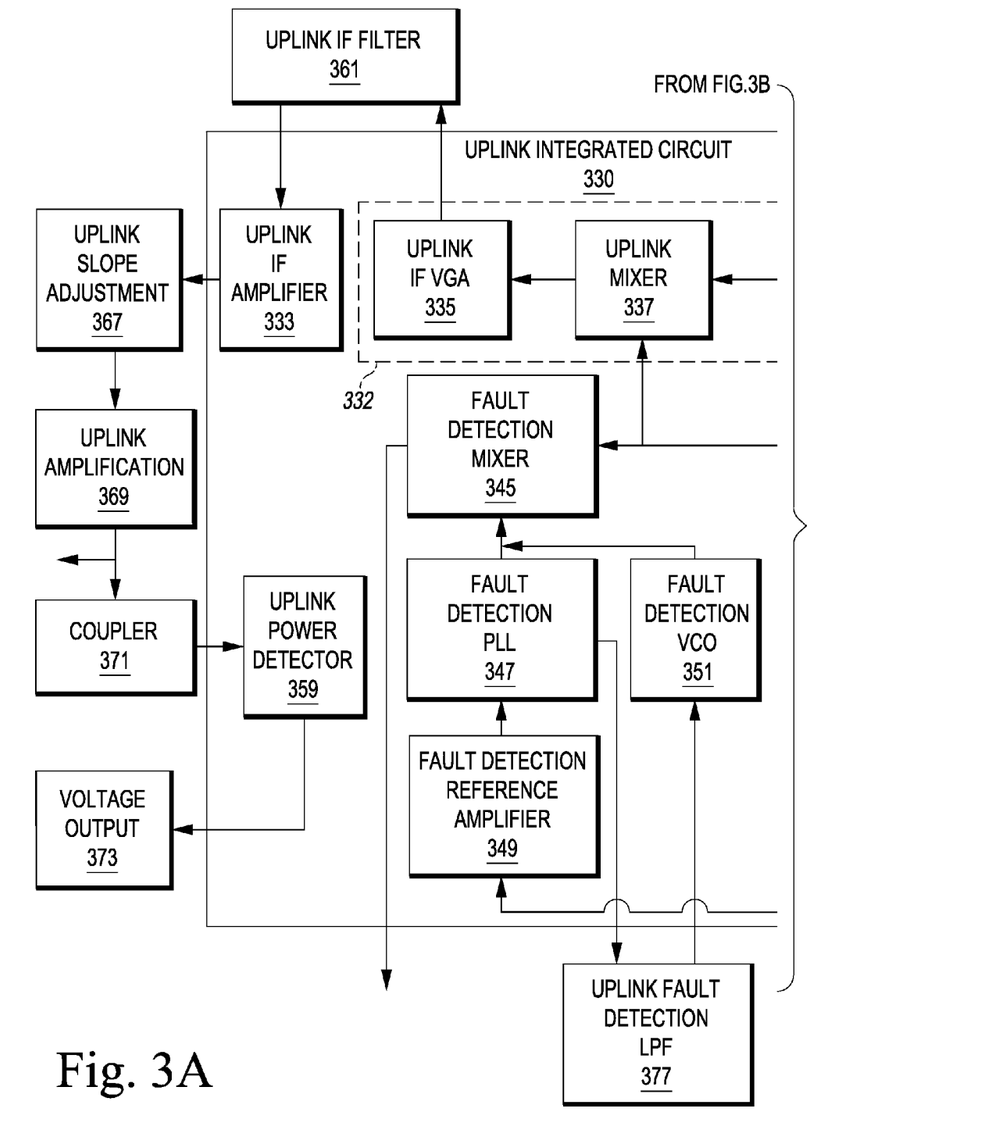
FIGS. 3A and 3B are a block diagram of one embodiment of an uplink integrated circuit in an RAU.
Figure 3B:
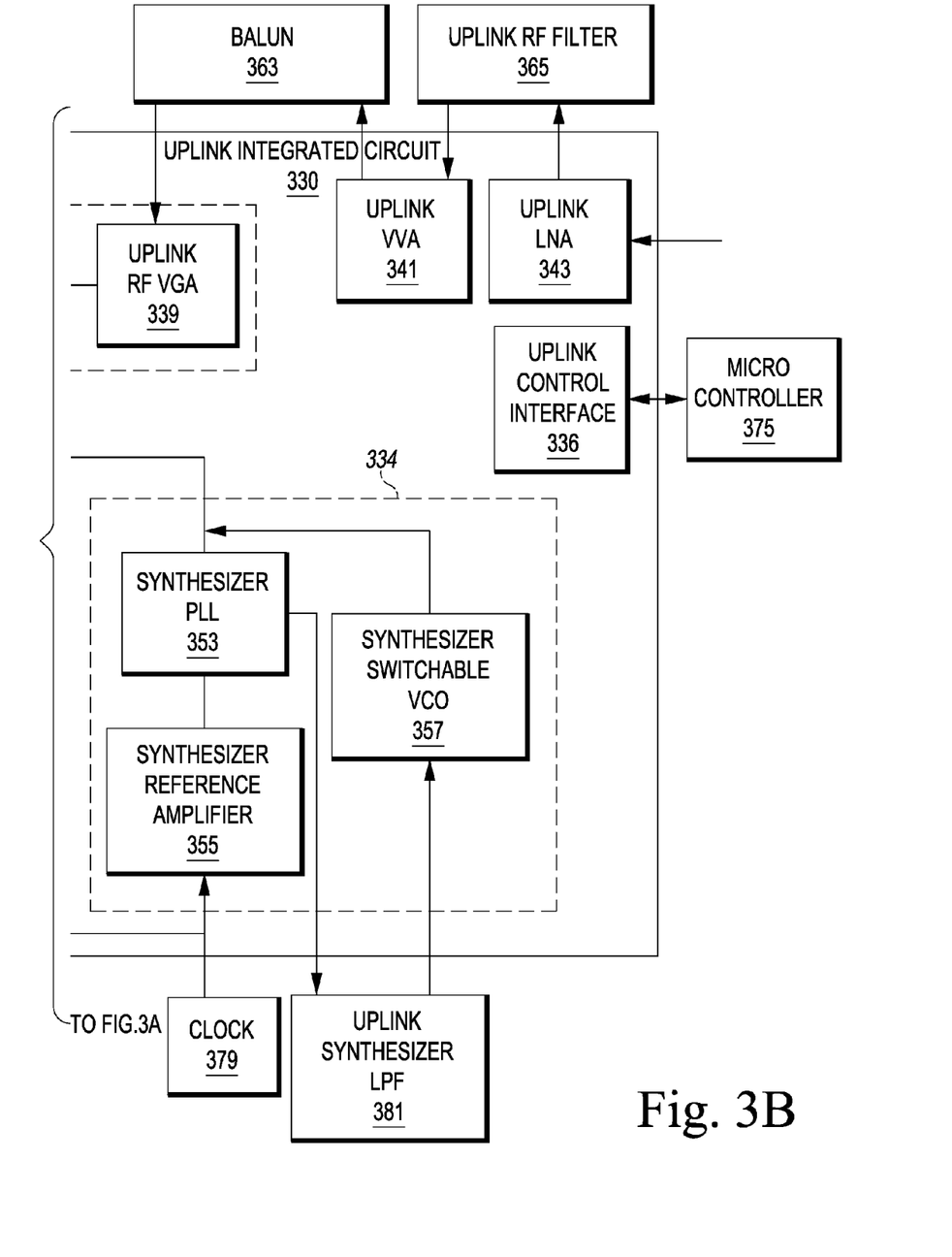

FIGS. 3A and 3B is a block diagram illustrating one embodiment of the uplink IC 330 along with supporting electronic components. Uplink IC 330 functions similarly to uplink IC 130 in FIG. 1. In at least one embodiment, uplink IC 330 includes uplink mixer stage 332, uplink synthesizer 334, and uplink control interface 336, which are similar to uplink mixer stage 132, uplink synthesizer 134, and uplink control interface 136, respectively. Before uplink mixer stage 332 receives an RF signal, the RF signal is received by an uplink low noise amplifier (LNA) 343, which amplifies the RF signal. When the RF signal is amplified by uplink LNA 343, the uplink IC 330 transmits the amplified signal to an uplink RF filter 365 which attenuates and filters the amplified RF signal. In one embodiment, uplink RF filter 365 includes a series of attenuation pads and a surface acoustic wave filter. When the RF signal has been filtered and adjusted, the uplink RF filter 365 transmits the RF signal back to uplink IC 330, where the signal is received by an uplink variable voltage attenuator (VVA) 341. Uplink VVA 341 adjusts the voltage to achieve a desired RF signal and then transmits the RF signal to a balun 363, which balances the signal. Balun 363 then transmits the signal back to uplink IC 330, where the signal is received by uplink mixer stage 332.

In certain embodiments, uplink mixer stage 332 includes an uplink RF VGA 339. In one example, uplink RF VGA 339 is able to provide a gain between 0 and 10 dB when amplifying the RF signal. Further, an off chip component or external computer can adjust the gain of uplink RF VGA 339 through uplink commands transmitted through uplink control interface 336. When uplink RF VGA 339 attenuates the gain of the RF signal, uplink RF VGA 339 transmits the attenuated RF signal to uplink mixer 337. Uplink mixer 337 receives an uplink oscillating signal from uplink synthesizer 334 and uses the oscillating signal to mix the amplified RF signal down to IF to form an IF signal. When uplink mixer 337 downconverts the RF signal to the IF signal, the IF signal is then transmitted to an uplink IF VGA 335. Uplink IF VGA 335 functions similarly to uplink RF VGA 339, in that the attenuation provided by uplink IF VGA 335 is controlled by an off chip component or by an external computer through downlink control interface 336. For example, uplink IF VGA 335 responds to a digital signal that adjusts the gain of uplink IF VGA 335 up to 30 dB in 1 dB steps when amplifying the IF signal.

When, the uplink IF VGA 335 amplifies the IF signal, the IF signal is transmitted off uplink IC 330 to an uplink IF filter 361. In at least one implementation, uplink IF filter 361 includes attenuation pads and a surface acoustic wave filter to filter the IF signal. When the IF signal has been filtered, the uplink IF filter 361 transmits the signal back to the uplink IC 330. Uplink IC 330 receives the filtered IF signal and directs the filtered IF signal to an uplink IF amplifier 333. Uplink IF amplifier 333 amplifies the IF signal and the signal is then transmitted off the board for uplink slope adjustment 367 and further uplink amplification 369 before the IF signal is transmitted to a hub unit such as hub unit 106 in FIG. 1.

As described above in FIG. 1, the uplink mixer stage 332 receives an oscillating signal that is produced by uplink synthesizer 334. Uplink synthesizer 334 produces the oscillating signal from a clock 379 or other device for producing a reference frequency. In certain implementations, when producing a reference frequency, clock 379 is able to provide multiple reference frequencies. For example, clock 379 provides reference frequencies of 10.7 MHz or 30.72 MHz. Further, in one implementation clock 379 and clock 229 in FIG. 2 are a single clock located in the RAU. Alternatively, clock 379 and clock 229 operated independently of one another in the RAU. The uplink synthesizer 334 receives the reference frequency with synthesizer reference amplifier 355. Synthesizer reference amplifier 355 amplifies the reference frequency. In at least one implementation, reference amplifier 355 also squares the reference frequency signal to create a low jitter square wave. When synthesizer reference amplifier 355 amplifies the reference frequency, the synthesizer reference amplifier 355 passes the amplified reference frequency to synthesizer PLL 353. Synthesizer PLL 353 adjusts the phase of the amplified reference frequency as necessary and transmits the adjusted reference frequency of the uplink IC 330 to an uplink synthesizer LPF 381. The uplink synthesizer LPF 381 filters adjusted reference frequency and passes the filtered reference frequency to synthesizer switchable VCO 357. Synthesizer switchable VCO 357 receives uplink commands through uplink control interface 336 that direct synthesizer switchable VCO 357 to provide the oscillating signal with the needed frequency for accurately mixing the RF signal down to the desired IF signal. The synthesizer switchable VCO 357 provides an oscillating signal that is combined with a corrective signal transmitted from synthesizer PLL 353 to provide the oscillating signal that is used by uplink mixer 337. In at least one implementation, an uplink command received through uplink control interface 336 can disable uplink synthesizer 334. When uplink synthesizer 334 is disabled, uplink mixer 337 receives an oscillating signal from a local oscillator that is located off of uplink integrated circuit 330. In at least one implementation, when synthesizer PLL 353 loses frequency lock, the frequency provided by the synthesizer switchable VCO 357 changes such that the synthesizer PLL 353 is able to lock the frequency.

In certain embodiments, uplink IC 330 includes components that aid in the detection of faults in the uplink path. To detect the faults in the uplink path, uplink IC 330 includes fault detection VCO 351, fault detection PLL 347, and fault detection reference amplifier 349. To detect the faults, the fault detection reference amplifier 349 receives a reference frequency from clock 379. Fault detection reference amplifier 349 amplifies the reference frequency. When fault detection reference amplifier 349 amplifies the reference frequency, the fault detection reference amplifier 349 passes the amplified reference frequency to fault detection PLL 347. Fault detection PLL 347 adjusts the phase of the amplified reference frequency as necessary and transmits the adjusted frequency to an uplink fault detection LPF 377. The uplink fault detection LPF 377 filters adjusted reference frequency and passes the filtered reference frequency to fault detection switchable VCO 351. The fault detection switchable VCO 351 provides a fault detecting signal that is combined with a corrective signal transmitted from fault detection PLL 347 and transmitted to a fault detection mixer 345. Fault detection mixer 345 also receives an oscillating signal from uplink synthesizer 334 and mixes the oscillating signal with the fault detecting signal to generate a tone that indicates that a fault has been detected in the uplink path. In at least one implementation, an uplink command received through uplink control interface 336 can disable or enable the detection of faults in the uplink path. Further, in at least one example, the detections of faults in the uplink path is enabled during the performance of a system test.

In a further embodiment, uplink integrated circuit 330 includes an uplink power detector 359. When a signal has been received and downconverted, filtered, and amplified by uplink IC 330 and accompanying support electronics, the signal transmitted from uplink amplification 369 is sent through a coupler 371 which transmits a signal to uplink power detector 359, which monitors the power that is transmitted to upstream devices from the RAU containing uplink IC 330. The uplink power detector 359 transmits the measured power as an output voltage 373. In at least one embodiment, the output voltage is received by a microcontroller.

As was described in relation to FIG. 1, where uplink IC 130 included an uplink control interface 136, uplink IC 330 includes an uplink control interface 336. In certain embodiments, uplink control interface 336 is an SPI wire interface that allows an external device to control the different components that are on uplink IC 330. For example, an external device can send uplink commands through uplink control interface that set the frequency of the oscillating signal. Further, the uplink commands can disable components on uplink IC 330. For example, an uplink command can enable the detection of faults in the uplink path when a system test is performed. In one embodiment, the external device connected to uplink IC 330 through uplink control interface 336 is a microcontroller 375 that is part of the RAU. In certain embodiments microcontroller 375 and microcontroller 231 in FIG. 2 are the same device. In an alternative embodiment, the external device is a computer that connects to the RAU and to uplink control interface 336 on the RAU.

Figure 4:
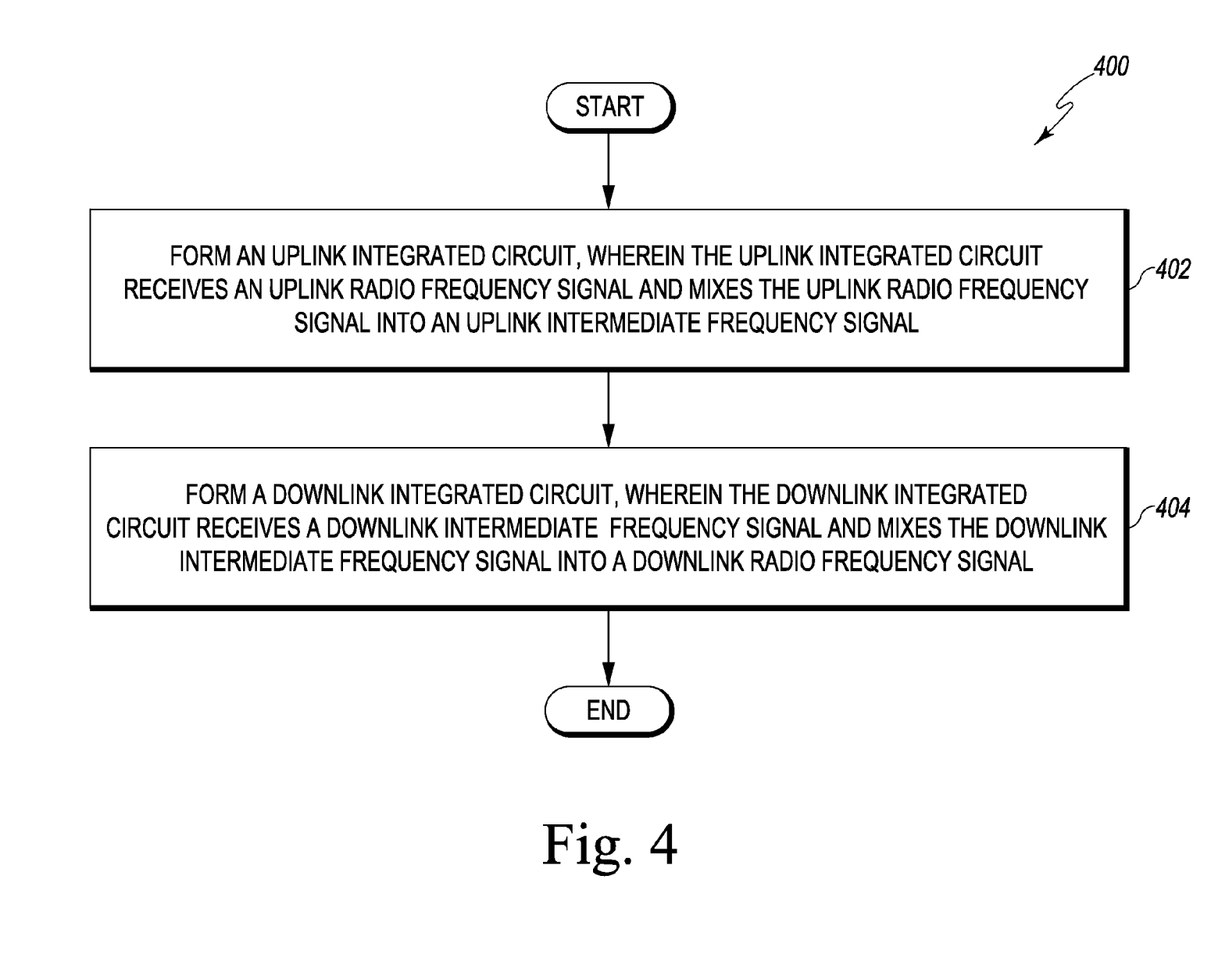
FIG. 4 is a flow diagram of a method for consolidating multiple components of an RAU onto integrated circuits according to one embodiment.

FIG. 4 is a flow diagram illustrating a method 400 for consolidating multiple components of a remote antenna unit onto integrated circuits. Method 400 begins at 402 where an uplink integrated circuit is formed, wherein the uplink integrated circuit receives an uplink radio frequency signal and mixes the uplink radio frequency signal into an uplink intermediate frequency signal. For example, uplink integrated circuit mixes the uplink radio frequency signal into an uplink intermediate frequency signal using an uplink synthesizer, an uplink mixer stage coupled to the uplink synthesizer, and an uplink control interface, which are similar to uplink mixer stage 332, uplink synthesizer 334, and uplink control interface 336 described above in relation to FIGS. 3A and 3B.

Method 400 proceeds at 404 where a downlink integrated circuit is formed, wherein the downlink integrated circuit receives a downlink intermediate frequency signal and mixes the downlink intermediate frequency signal into a downlink radio frequency signal. For example, downlink integrated circuit mixes the downlink intermediate frequency signal into a downlink radio frequency signal using a downlink synthesizer, a downlink mixer stage coupled to the downlink synthesizer, and a downlink control interface, which are similar to downlink mixer stage 222, downlink synthesizer 224, and downlink control interface 226 described above in relation to FIG. 2. In at least one embodiment, the downlink integrated circuit and the uplink integrated circuit are fabricated using a silicon germanium process.

Example Embodiments

Example 1 includes a remote antenna unit in a distributed antenna system, the antenna unit comprising an uplink integrated circuit, wherein the uplink integrated circuit receives a radio frequency signal, the uplink integrated circuit comprising an uplink synthesizer configured to provide an uplink oscillating signal in at least one frequency; an uplink mixer stage coupled to the uplink synthesizer, the uplink mixer stage configured to mix the uplink radio frequency signal with the uplink oscillating signal to produce an uplink intermediate frequency signal; and an uplink control interface configured to receive uplink commands that control the frequency of the uplink oscillating signal; the antenna unit further comprising a downlink integrated circuit that is electrically isolated from the uplink integrated circuit, wherein the downlink integrated circuit receives a downlink intermediate frequency signal, the downlink integrated circuit comprising a downlink synthesizer configured to provide a downlink oscillating signal in at least one frequency; a downlink mixer stage coupled to the downlink synthesizer, the downlink mixer stage configured to mix the downlink intermediate frequency signal with the downlink oscillating signal to produce a down link radio frequency signal; a downlink control interface configured to receive downlink commands that control the frequency of the downlink oscillating signal; and at least one clock configured to provide at least one reference frequency to the uplink synthesizer and the downlink synthesizer.

Example 2 includes the remote antenna unit of Example 1, wherein the uplink mixer stage comprises an uplink radio frequency variable gain attenuator, wherein the gain of the uplink radio frequency variable gain attenuator is set by the uplink commands; an uplink mixer configured to mix the uplink radio frequency signal with the uplink oscillating signal to produce an uplink intermediate frequency signal; and an uplink intermediate frequency variable gain attenuator, wherein the gain of the uplink intermediate frequency variable gain attenuator is set by the uplink commands.

Example 3 includes the remote antenna unit of Example 2, wherein the uplink mixer performs both low-side mixing and high-side mixing.

Example 4 includes the remote antenna unit of any of Examples 1-3, wherein the uplink synthesizer comprises a synthesizer switchable voltage controlled oscillator configured to respond to the uplink commands by providing the uplink oscillating signal, wherein the uplink commands set the frequency of the uplink oscillating signal; and a synthesizer phase lock loop configured to adjust the phase of the uplink oscillating signal.

Example 5 includes the remote antenna unit of any of Examples 1-4, wherein the uplink control interface disables the uplink synthesizer in response to an uplink command, whereupon the uplink mixer receives the uplink oscillating signal from a device located off of the uplink integrated circuit.

Example 6 includes the remote antenna unit of any of Examples 1-5, wherein the uplink integrated circuit further comprises an uplink intermediate frequency amplifier configured to amplify the uplink intermediate frequency signal.

Example 7 includes the remote antenna unit of any of Examples 1-6, wherein the uplink integrated circuit further comprises an uplink radio frequency variable voltage attenuator configured to attenuate the uplink radio frequency signal in response to an uplink command received over the uplink control interface.

Example 8 includes the remote antenna unit of any of Examples 1-7, wherein the uplink integrated circuit further comprises an uplink low noise amplifier configured to amplify the uplink radio frequency signal while limiting noise introduced into the uplink radio frequency signal.

Example 9 includes the remote antenna unit of any of Examples 1-8, wherein the uplink integrated circuit further comprises an uplink power detector configured to detect the power of the uplink intermediate frequency signal before the uplink intermediate frequency signal is transmitted to upstream devices.

Example 10 includes the remote antenna unit of any of Examples 1-9, wherein the uplink integrated circuit further includes fault detection components configured to detect a fault in the uplink path through the remote antenna unit, wherein the fault detection components generate a tone for fault detection.

Example 11 includes the remote antenna unit of Example 10, wherein the fault detection components comprise a fault detection switchable voltage controlled oscillator configured to respond to an uplink command by providing a fault detection oscillating signal, wherein the uplink commands set the frequency of the fault detection oscillating signal; and a fault detection phase lock loop configured to adjust the phase of the fault detection oscillating signal; and a fault detection mixer configured to mix the fault detection oscillating signal with the uplink oscillating signal to generate a fault detection tone.

Example 12 includes the remote antenna unit of any of Examples 1-11, wherein the downlink mixer stage comprises a downlink intermediate frequency variable gain attenuator configured to attenuate the downlink intermediate frequency signal, wherein the gain of the downlink intermediate frequency variable gain attenuator is set by the downlink commands; a downlink mixer configured to mix the downlink radio frequency signal with the downlink oscillating signal to produce a downlink intermediate frequency signal; and a downlink radio frequency variable gain attenuator configured to attenuate the downlink radio frequency signal, wherein the gain of the downlink radio frequency variable gain attenuator is set by the downlink commands.

Example 13 includes the remote antenna unit Example 12, wherein the downlink mixer performs both low-side mixing and high-side mixing.

Example 14 includes the remote antenna unit of any of Examples 1-13, wherein the downlink synthesizer comprises a downlink switchable voltage controlled oscillator configured to respond to the downlink commands by providing the downlink oscillating signal, wherein the downlink commands set the frequency of the downlink oscillating signal; and a synthesizer phase lock loop configured to adjust the phase of the uplink oscillating signal.

Example 15 includes the remote antenna unit of any of Examples 1-14, wherein the downlink control interface disables the downlink synthesizer in response to the downlink commands, whereupon the downlink mixer stage receives the downlink oscillating signal from a device located off of the downlink integrated circuit.

Example 16 includes the remote antenna unit of any of Examples 1-15, wherein the downlink integrated circuit further comprises a downlink intermediate frequency amplifier configured to amplify the downlink intermediate frequency signal.

Example 17 includes the remote antenna unit of any of Examples 1-16, wherein the downlink integrated circuit further comprises a downlink radio frequency amplifier configured to amplify the downlink radio frequency signal.

Example 18 includes the remote antenna unit of any of Examples 1-17, wherein the downlink integrated circuit further comprises a downlink power detector configured to detect the power of the downlink radio frequency signal before the downlink radio frequency signal is transmitted to an antenna for transmission.

Example 19 includes the remote antenna unit of any of Examples 1-18, further comprising a microcontroller configured to issue uplink commands to the uplink integrated circuit and downlink commands to the downlink integrated circuit.

Example 20 includes the remote antenna unit of any of Examples 1-19, wherein the remote antenna unit includes uplink supporting circuitry configured to support the operation of the uplink integrated circuit, wherein the uplink supporting circuitry comprises an uplink intermediate frequency filter configured to filter the uplink intermediate frequency signal; a balun configured to balance the uplink radio frequency signal; an uplink radio frequency filter configured to filter the uplink radio frequency signal; and an uplink synthesizer low pass filter configured to filter a reference frequency for the uplink synthesizer.

Example 21 includes the remote antenna unit of any of Examples 1-20, wherein the remote antenna unit includes downlink supporting circuitry configured to support the operation of the downlink integrated circuit, wherein the downlink supporting circuitry comprises a downlink intermediate frequency filter configured to filter the downlink intermediate frequency signal; a downlink radio frequency filter configured to filter the downlink radio frequency signal; and a downlink synthesizer low pass filter configured to filter a reference frequency for the downlink synthesizer.

Example 22 includes a method for consolidating multiple components of a remote antenna unit onto integrated circuits, the method comprising forming an uplink integrated circuit, wherein the uplink integrated circuit receives an uplink radio frequency signal and mixes the uplink radio frequency signal into an uplink intermediate frequency signal, wherein the uplink radio frequency signal has a frequency in one of a plurality of uplink frequency bands; and forming a downlink integrated circuit that is electrically isolated from the uplink integrated circuit, wherein the downlink integrated circuit receives a downlink intermediate frequency signal and mixes the downlink intermediate frequency signal into a downlink radio frequency signal, wherein the downlink radio frequency signal has a frequency in one of a plurality of downlink frequency bands.

Example 23 includes the method of Example 22, further comprising providing filtering and attenuation to support the operation of the uplink integrated circuit and the downlink integrated circuit.

Example 24 includes the method of any of Examples 22-23, further comprising providing a reference frequency source to transmit at least one reference frequency to the downlink integrated circuit and the uplink integrated circuit.

Example 25 includes the method of any of Examples 22-24, further comprising providing a microcontroller configured to transmit downlink commands to the downlink integrated circuit and uplink commands to the uplink integrated circuit.

Example 26 includes the method of any of Examples 22-25, wherein the uplink integrated circuit and the downlink integrated circuit are formed using a silicon germanium process.

Example 27 includes a distributed antenna system, the system comprising: at least one hub unit configured to communicate with a base station; a plurality of remote antenna units communicatively coupled to the at least one hub and configured to communicatively couple signals between the at least one hub and a plurality of wireless terminals, a remote antenna unit in the plurality of remote antenna units comprising an uplink integrated circuit, wherein the uplink integrated circuit receives a radio frequency signal, the uplink integrated circuit comprising an uplink synthesizer configured to provide an uplink oscillating signal in at least one frequency; an uplink mixer stage coupled to the uplink synthesizer, the uplink mixer stage configured to mix the radio frequency signal with the uplink oscillating signal to produce an uplink intermediate frequency signal; and an uplink control interface configured to receive uplink commands that control the frequency of the uplink oscillating signal; the remote antenna unit also comprising a downlink integrated circuit that is electrically isolated from the uplink integrated circuit, wherein the downlink integrated circuit receives a downlink intermediate frequency signal, the downlink integrated circuit comprising a downlink synthesizer configured to provide a downlink oscillating signal in at least one frequency; a downlink mixer stage coupled to the downlink synthesizer, the downlink mixer stage configured to mix the downlink intermediate frequency signal with the downlink oscillating signal to produce a down link radio frequency signal; a downlink control interface configured to receive downlink commands that control the frequency of the downlink oscillating signal.

Example 28 includes the distributed antenna system of Example 27, wherein the uplink synthesizer, and the uplink mixer stage are located in the integrated circuit such that uplink synthesizer is electrically isolated from the uplink mixer stage.

Example 29 includes the distributed antenna system of any of Examples 27-28, wherein the downlink synthesizer, and the downlink mixer stage are located in the integrated circuit such that uplink synthesizer is electrically isolated from the uplink mixer stage.

Example 30 includes the distributed antenna system of any of Examples 27-29, wherein the uplink mixer stage comprises an uplink radio frequency variable gain attenuator, wherein the gain of the uplink radio frequency variable gain attenuator is set by the uplink commands; an uplink mixer configured to mix the uplink radio frequency signal with the uplink oscillating signal to produce an uplink intermediate frequency signal; and an uplink intermediate frequency variable gain attenuator, wherein the gain of the uplink intermediate frequency variable gain attenuator is set by the uplink commands.

Example 31 includes the distributed antenna system of any of Examples 27-30, wherein the uplink synthesizer comprises a synthesizer switchable voltage controlled oscillator configured to respond to the uplink commands by providing the uplink oscillating signal, wherein the uplink commands set the frequency of the uplink oscillating signal; and a synthesizer phase lock loop configured to adjust the phase of the uplink oscillating signal.

Example 32 includes the distributed antenna system of any of Examples 27-31, wherein the uplink control interface disables the uplink synthesizer in response to an uplink command, whereupon the uplink mixer receives the uplink oscillating signal from a device located off of the uplink integrated circuit.

Example 33 includes the distributed antenna system of any of Examples 27-32, wherein the uplink integrated circuit further comprises an uplink power detector configured to detect the power of the uplink intermediate frequency signal before the uplink intermediate frequency signal is transmitted to upstream devices.

Example 34 includes the distributed antenna system of any of Examples 27-33, wherein the uplink integrated circuit further includes fault detection components configured to detect a fault in the uplink path through the remote antenna unit, wherein the fault detection components generate a tone for fault detection.

Example 35 includes the distributed antenna system Example 34, wherein the fault detection components comprise a fault detection switchable voltage controlled oscillator configured to respond to an uplink command by providing a fault detection oscillating signal, wherein the uplink commands set the frequency of the fault detection oscillating signal; and a fault detection phase lock loop configured to adjust the phase of the fault detection oscillating signal; and a fault detection mixer configured to mix the fault detection oscillating signal with the uplink oscillating signal to generate a fault detection tone.

Example 36 includes the distributed antenna system of any of Examples 27-35, wherein the downlink mixer stage comprises a downlink intermediate frequency variable gain attenuator configured to attenuate the downlink intermediate frequency signal, wherein the gain of the downlink intermediate frequency variable gain attenuator is set by the downlink commands; a downlink mixer configured to mix the downlink radio frequency signal with the downlink oscillating signal to produce a downlink intermediate frequency signal; and a downlink radio frequency variable gain attenuator configured to attenuate the downlink radio frequency signal, wherein the gain of the downlink radio frequency variable gain attenuator is set by the downlink commands.

Example 37 includes the distributed antenna system of any of Examples 27-36, wherein the downlink synthesizer comprises a downlink switchable voltage controlled oscillator configured to respond to the downlink commands by providing the downlink oscillating signal, wherein the downlink commands set the frequency of the downlink oscillating signal; and a synthesizer phase lock loop configured to adjust the phase of the uplink oscillating signal.

Example 38 includes the distributed antenna system of any of Examples 27-37, wherein the downlink control interface disables the downlink synthesizer in response to the downlink commands, whereupon the downlink mixer stage receives the downlink oscillating signal from a device located off of the downlink integrated circuit.

Example 39 includes the distributed antenna system of any of Examples 27-38, wherein the downlink integrated circuit further comprises a downlink power detector configured to detect the power of the downlink radio frequency signal before the downlink radio frequency signal is transmitted to an antenna for transmission.

Example 40 includes the distributed antenna system of any of Examples 27-39, further comprising a microcontroller configured to issue uplink commands to the uplink integrated circuit and downlink commands to the downlink integrated circuit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A remote antenna unit in a distributed antenna system, the antenna unit comprising:
   an uplink integrated circuit, wherein the uplink integrated circuit receives a radio frequency signal, the uplink integrated circuit comprising:
   an uplink synthesizer configured to provide an uplink oscillating signal in at least one frequency;
   an uplink mixer stage coupled to the uplink synthesizer, the uplink mixer stage configured to mix the uplink radio frequency signal with the uplink oscillating signal to produce an uplink intermediate frequency signal; and
   an uplink control interface configured to receive uplink commands that control the frequency of the uplink oscillating signal;
   the antenna unit further comprising a downlink integrated circuit that is electrically isolated from the uplink integrated circuit, wherein the downlink integrated circuit receives a downlink intermediate frequency signal, the downlink integrated circuit comprising:
   a downlink synthesizer configured to provide a downlink oscillating signal in at least one frequency;
   a downlink mixer stage coupled to the downlink synthesizer, the downlink mixer stage configured to mix the downlink intermediate frequency signal with the downlink oscillating signal to produce a down link radio frequency signal;

a downlink control interface configured to receive downlink commands that control the frequency of the downlink oscillating signal; and at least one clock configured to provide at least one reference frequency to the uplink synthesizer and the downlink synthesizer.

2. The remote antenna unit of claim 1, wherein the uplink mixer stage comprises:

an uplink radio frequency variable gain attenuator, wherein the gain of the uplink radio frequency variable gain attenuator is set by the uplink commands;

an uplink mixer configured to mix the uplink radio frequency signal with the uplink oscillating signal to produce an uplink intermediate frequency signal; and an uplink intermediate frequency variable gain attenuator, wherein the gain of the uplink intermediate frequency variable gain attenuator is set by the uplink commands.

3. The remote antenna unit of claim 2, wherein the uplink mixer performs both low-side mixing and high-side mixing.

4. The remote antenna unit of claim 1, wherein the uplink synthesizer comprises:

a synthesizer switchable voltage controlled oscillator configured to respond to the uplink commands by providing the uplink oscillating signal, wherein the uplink commands set the frequency of the uplink oscillating signal; and a synthesizer phase lock loop configured to adjust the phase of the uplink oscillating signal.

5. The remote antenna unit of claim 1, wherein the uplink control interface disables the uplink synthesizer in response to an uplink command, whereupon the uplink mixer receives the uplink oscillating signal from a device located off of the uplink integrated circuit.

6. The remote antenna unit of claim 1, wherein the uplink integrated circuit further comprises an uplink intermediate frequency amplifier configured to amplify the uplink intermediate frequency signal.

7. The remote antenna unit of claim 1, wherein the uplink integrated circuit further comprises an uplink radio frequency variable voltage attenuator configured to attenuate the uplink radio frequency signal in response to an uplink command received over the uplink control interface.

8. The remote antenna unit of claim 1, wherein the uplink integrated circuit further comprises an uplink low noise amplifier configured to amplify the uplink radio frequency signal while limiting noise introduced into the uplink radio frequency signal.

9. The remote antenna unit of claim 1, wherein the uplink integrated circuit further comprises an uplink power detector configured to detect the power of the uplink intermediate frequency signal before the uplink intermediate frequency signal is transmitted to upstream devices.

10. The remote antenna unit of claim 1, wherein the uplink integrated circuit further includes fault detection components configured to detect a fault in the uplink path through the remote antenna unit, wherein the fault detection components generate a tone for fault detection.

11. The remote antenna unit of claim 10, wherein the fault detection components comprise:

a fault detection switchable voltage controlled oscillator configured to respond to an uplink command by providing a fault detection oscillating signal, wherein the uplink commands set the frequency of the fault detection oscillating signal; and a fault detection phase lock loop configured to adjust the phase of the fault detection oscillating signal; and a fault detection mixer configured to mix the fault detection oscillating signal with the uplink oscillating signal to generate a fault detection tone.

12. The remote antenna unit of claim 1, wherein the downlink mixer stage comprises:

a downlink intermediate frequency variable gain attenuator configured to attenuate the downlink intermediate frequency signal, wherein the gain of the downlink intermediate frequency variable gain attenuator is set by the downlink commands;

a downlink mixer configured to mix the downlink radio frequency signal with the downlink oscillating signal to produce a downlink intermediate frequency signal; and a downlink radio frequency variable gain attenuator configured to attenuate the downlink radio frequency signal, wherein the gain of the downlink radio frequency variable gain attenuator is set by the downlink commands.

13. The remote antenna unit of claim 12, wherein the downlink mixer performs both low-side mixing and high-side mixing.

14. The remote antenna unit of claim 1, wherein the downlink synthesizer comprises:

a downlink switchable voltage controlled oscillator configured to respond to the downlink commands by providing the downlink oscillating signal, wherein the downlink commands set the frequency of the downlink oscillating signal; and a synthesizer phase lock loop configured to adjust the phase of the uplink oscillating signal.

15. The remote antenna unit of claim 1, wherein the downlink control interface disables the downlink synthesizer in response to the downlink commands, whereupon the downlink mixer stage receives the downlink oscillating signal from a device located off of the downlink integrated circuit.

16. The remote antenna unit of claim 1, wherein the downlink integrated circuit further comprises a downlink intermediate frequency amplifier configured to amplify the downlink intermediate frequency signal.

17. The remote antenna unit of claim 1, wherein the downlink integrated circuit further comprises a downlink radio frequency amplifier configured to amplify the downlink radio frequency signal.

18. The remote antenna unit of claim 1, wherein the downlink integrated circuit further comprises a downlink power detector configured to detect the power of the downlink radio frequency signal before the downlink radio frequency signal is transmitted to an antenna for transmission.

19. The remote antenna unit of claim 1, further comprising a microcontroller configured to issue uplink commands to the uplink integrated circuit and downlink commands to the downlink integrated circuit.

20. The remote antenna unit of claim 1, wherein the remote antenna unit includes uplink supporting circuitry configured to support the operation of the uplink integrated circuit, wherein the uplink supporting circuitry comprises:

an uplink intermediate frequency filter configured to filter the uplink intermediate frequency signal;

a balun configured to balance the uplink radio frequency signal;

an uplink radio frequency filter configured to filter the uplink radio frequency signal; and an uplink synthesizer low pass filter configured to filter a reference frequency for the uplink synthesizer.

21. The remote antenna unit of claim 1, wherein the remote antenna unit includes downlink supporting circuitry configured to support the operation of the downlink integrated circuit, wherein the downlink supporting circuitry comprises:

a downlink intermediate frequency filter configured to filter the downlink intermediate frequency signal;

a downlink radio frequency filter configured to filter the downlink radio frequency signal; and a downlink synthesizer low pass filter configured to filter a reference frequency for the downlink synthesizer.

22. A method for consolidating multiple components of a remote antenna unit onto integrated circuits, the method comprising:

forming an uplink integrated circuit, wherein the uplink integrated circuit receives an uplink radio frequency signal and mixes the uplink radio frequency signal into an uplink intermediate frequency signal, wherein the uplink radio frequency signal has a frequency in one of a plurality of uplink frequency bands; and forming a downlink integrated circuit that is electrically isolated from the uplink integrated circuit, wherein the downlink integrated circuit receives a downlink intermediate frequency signal and mixes the downlink intermediate frequency signal into a downlink radio frequency signal, wherein the downlink radio frequency signal has a frequency in one of a plurality of downlink frequency bands.

23. The method of claim 22, further comprising providing filtering and attenuation to support the operation of the uplink integrated circuit and the downlink integrated circuit.

24. The method of claim 22, further comprising providing a reference frequency source to transmit at least one reference frequency to the downlink integrated circuit and the uplink integrated circuit.

25. The method of claim 22, further comprising providing a microcontroller configured to transmit downlink commands to the downlink integrated circuit and uplink commands to the uplink integrated circuit.

26. The method of claim 22, wherein the uplink integrated circuit and the downlink integrated circuit are formed using a silicon germanium process.

27. A distributed antenna system, the system comprising:

at least one hub unit configured to communicate with a base station;

a plurality of remote antenna units communicatively coupled to the at least one hub and configured to communicatively couple signals between the at least one hub and a plurality of wireless terminals, a remote antenna unit in the plurality of remote antenna units comprising:

an uplink integrated circuit, wherein the uplink integrated circuit receives a radio frequency signal, the uplink integrated circuit comprising:

an uplink synthesizer configured to provide an uplink oscillating signal in at least one frequency;

an uplink mixer stage coupled to the uplink synthesizer, the uplink mixer stage configured to mix the radio frequency signal with the uplink oscillating signal to produce an uplink intermediate frequency signal; and an uplink control interface configured to receive uplink commands that control the frequency of the uplink oscillating signal;

the remote antenna unit also comprising a downlink integrated circuit that is electrically isolated from the uplink integrated circuit, wherein the downlink integrated circuit receives a downlink intermediate frequency signal, the downlink integrated circuit comprising:

a downlink synthesizer configured to provide a downlink oscillating signal in at least one frequency;

a downlink mixer stage coupled to the downlink synthesizer, the downlink mixer stage configured to mix the downlink intermediate frequency signal with the downlink oscillating signal to produce a down link radio frequency signal;

a downlink control interface configured to receive downlink commands that control the frequency of the downlink oscillating signal.

28. The distributed antenna system of claim 27, wherein the uplink synthesizer, and the uplink mixer stage are located in the integrated circuit such that uplink synthesizer is electrically isolated from the uplink mixer stage.

29. The distributed antenna system of claim 27, wherein the downlink synthesizer, and the downlink mixer stage are located in the integrated circuit such that uplink synthesizer is electrically isolated from the uplink mixer stage.

30. The distributed antenna system of claim 27, wherein the uplink mixer stage comprises:

an uplink radio frequency variable gain attenuator, wherein the gain of the uplink radio frequency variable gain attenuator is set by the uplink commands;

an uplink mixer configured to mix the uplink radio frequency signal with the uplink oscillating signal to produce an uplink intermediate frequency signal; and an uplink intermediate frequency variable gain attenuator, wherein the gain of the uplink intermediate frequency variable gain attenuator is set by the uplink commands.

31. The distributed antenna system of claim 27, wherein the uplink synthesizer comprises:

a synthesizer switchable voltage controlled oscillator configured to respond to the uplink commands by providing the uplink oscillating signal, wherein the uplink commands set the frequency of the uplink oscillating signal; and a synthesizer phase lock loop configured to adjust the phase of the uplink oscillating signal.

32. The distributed antenna system of claim 27, wherein the uplink control interface disables the uplink synthesizer in response to an uplink command, whereupon the uplink mixer receives the uplink oscillating signal from a device located off of the uplink integrated circuit.

33. The distributed antenna system of claim 27, wherein the uplink integrated circuit further comprises an uplink power detector configured to detect the power of the uplink intermediate frequency signal before the uplink intermediate frequency signal is transmitted to upstream devices.

34. The distributed antenna system of claim 27, wherein the uplink integrated circuit further includes fault detection components configured to detect a fault in the uplink path through the remote antenna unit, wherein the fault detection components generate a tone for fault detection.

35. The distributed antenna system of claim 34, wherein the fault detection components comprise:

a fault detection switchable voltage controlled oscillator configured to respond to an uplink command by providing a fault detection oscillating signal, wherein the uplink commands set the frequency of the fault detection oscillating signal; and a fault detection phase lock loop configured to adjust the phase of the fault detection oscillating signal; and a fault detection mixer configured to mix the fault detection oscillating signal with the uplink oscillating signal to generate a fault detection tone.

36. The distributed antenna system of claim 27, wherein the downlink mixer stage comprises:

a downlink intermediate frequency variable gain attenuator configured to attenuate the downlink intermediate frequency signal, wherein the gain of the downlink intermediate frequency variable gain attenuator is set by the downlink commands;

a downlink mixer configured to mix the downlink radio frequency signal with the downlink oscillating signal to produce a downlink intermediate frequency signal; and a downlink radio frequency variable gain attenuator configured to attenuate the downlink radio frequency signal, wherein the gain of the downlink radio frequency variable gain attenuator is set by the downlink commands.

37. The distributed antenna system of claim 27, wherein the downlink synthesizer comprises:

a downlink switchable voltage controlled oscillator configured to respond to the downlink commands by providing the downlink oscillating signal, wherein the downlink commands set the frequency of the downlink oscillating signal; and a synthesizer phase lock loop configured to adjust the phase of the uplink oscillating signal.

38. The distributed antenna system of claim 27, wherein the downlink control interface disables the downlink synthesizer in response to the downlink commands, whereupon the downlink mixer stage receives the downlink oscillating signal from a device located off of the downlink integrated circuit.

39. The distributed antenna system of claim 27, wherein the downlink integrated circuit further comprises a downlink power detector configured to detect the power of the downlink radio frequency signal before the downlink radio frequency signal is transmitted to an antenna for transmission.

40. The distributed antenna system of claim 27, further comprising a microcontroller configured to issue uplink commands to the uplink integrated circuit and downlink commands to the downlink integrated circuit.

* * * * *